United States Patent [19]

Bryne

[11] Patent Number: 5,546,829
[45] Date of Patent: Aug. 20, 1996

[54] CLIPLESS BICYCLE PEDAL SYSTEM

[75] Inventor: Richard M. Bryne, San Diego, Calif.

[73] Assignee: Speedplay, Inc., San Diego, Calif.

[21] Appl. No.: 184,029

[22] Filed: Jan. 21, 1994

Related U.S. Application Data

[63] Continuation-in-part of Ser. No. 947,350, Sep. 18, 1992, Pat. No. 5,325,738, which is a continuation-in-part of Ser. No. 804,070, Dec. 9, 1991, abandoned.

[51] Int. Cl.[6] .............................. B62M 3/08; G05G 1/14
[52] U.S. Cl. ................................. 74/594.6; 36/131
[58] Field of Search ........................... 74/594.4, 594.6; 36/131; 384/374, 375, 377

[56] References Cited

U.S. PATENT DOCUMENTS

| | | | |
|---|---|---|---|
| 968,911 | 9/1910 | Zerr | 348/377 X |
| 2,706,418 | 4/1955 | Liljenberg | 74/594.4 |
| 3,807,255 | 4/1974 | Baginski | 74/594.4 |
| 4,298,210 | 11/1981 | Lotteau et al. | |
| 4,361,972 | 12/1982 | Miller | |
| 4,815,333 | 3/1989 | Sampson | |
| 4,856,365 | 9/1989 | Romano | 74/594.6 |
| 5,046,382 | 9/1991 | Steinberg | |
| 5,251,508 | 10/1993 | Robbins | 74/594.4 X |
| 5,325,738 | 7/1994 | Bryne | 74/594.6 |

FOREIGN PATENT DOCUMENTS

| | | | |
|---|---|---|---|
| 0146218 | 6/1985 | European Pat. Off. | |
| 2196264 | 3/1974 | France | |
| 2279607 | 2/1976 | France | 74/594.6 |
| 2346322 | 3/1975 | Germany | |
| 2362679 | 6/1975 | Germany | |
| 3149345 | 12/1981 | Germany | |
| 3426103 | 7/1984 | Germany | |
| 3315282 | 10/1984 | Germany | 74/594.6 |
| 3724578 | 7/1987 | Germany | |
| 8806315 | 8/1988 | WIPO | /2279607 |

OTHER PUBLICATIONS

Bebop Incorporated Brochure, Sep. 1993.
Article In Bicycle Guide Magazine, Aug. 1993, pp. 42–45.

*Primary Examiner*—Charles A. Marmor
*Assistant Examiner*—Mary Ann Battista
*Attorney, Agent, or Firm*—Brown, Martin, Haller & McClain

[57] ABSTRACT

The clipless pedal system for mountain bikes or other bicycles comprises a generally circular pedal body, at least one side of which has a mushroom or T-shaped extension which is created by extending tabs over a small diameter neck. The cleat consists of a mounting plate which can be attached to the sole of mountain biking shoe, and has a generally open interior of sufficient dimensions to permit insertion of the head therein. Engaging means extend inwardly at a spacing corresponding to the head of the extension. The engaging means can be inserted into the neck of the extension to catch just below the head of the extension. An eccentric stop prevents forward motion of the cleat relative to the pedal beyond a predetermined point. A spring tab is used to releasably lock the cleat and pedal extension together once the head is in position with respect to the engaging means and in contact with the eccentric stop.

28 Claims, 7 Drawing Sheets

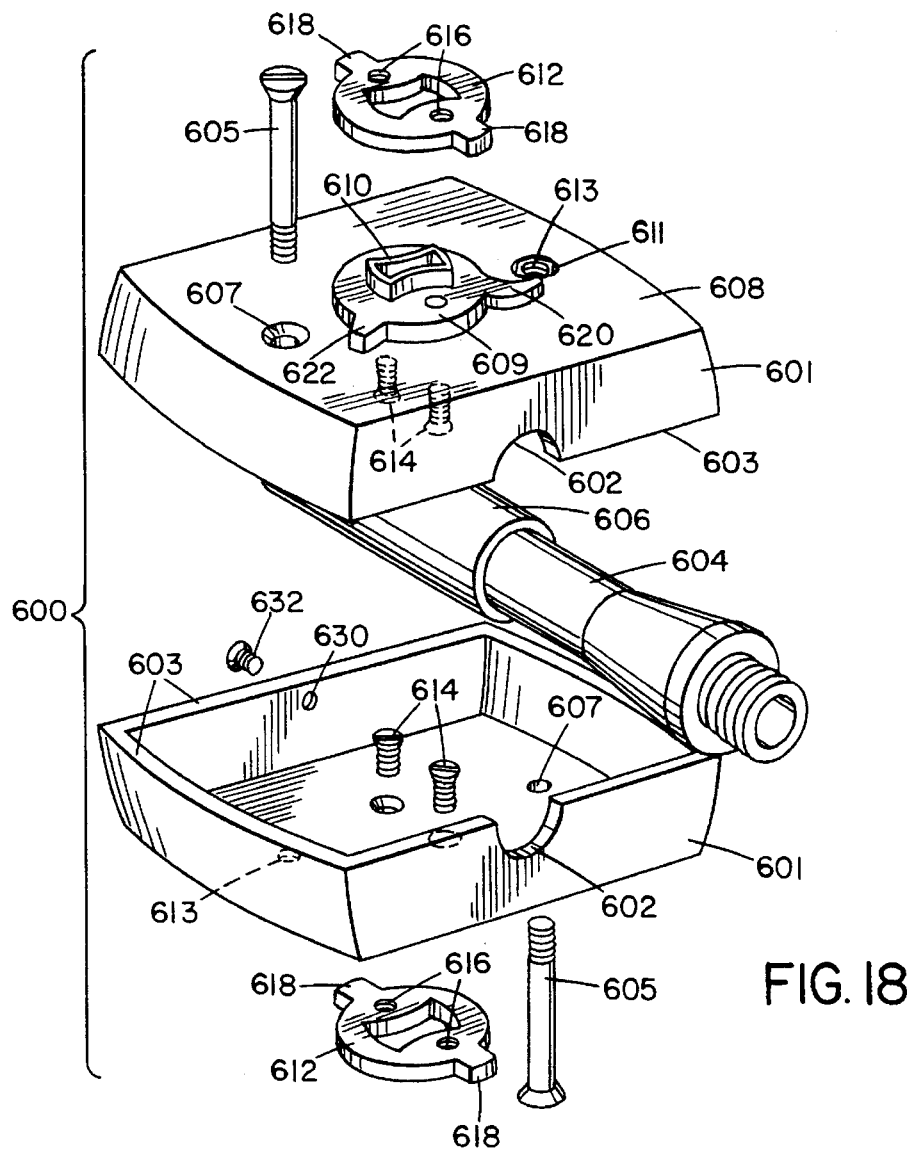
FIG. 18
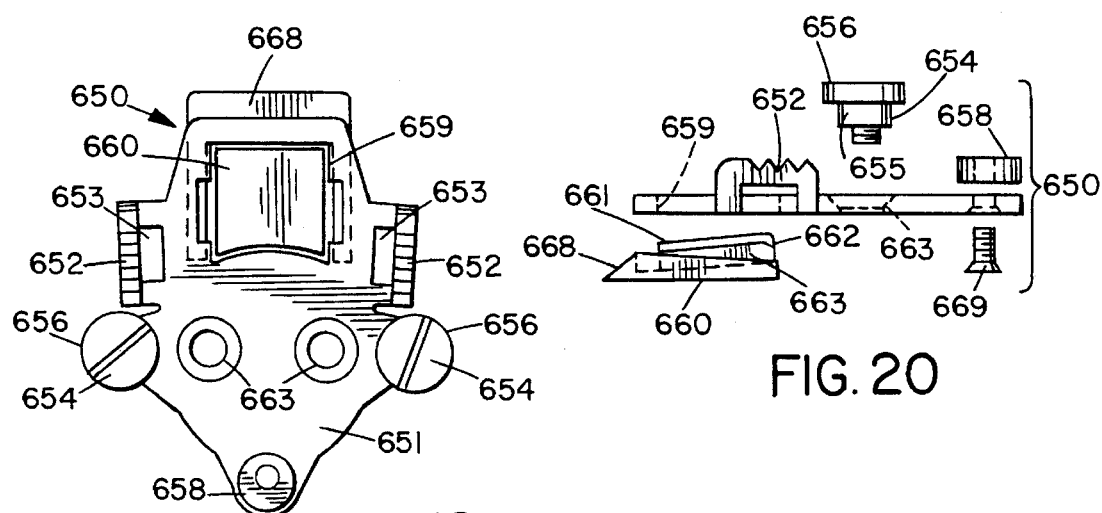
FIG. 19
FIG. 20

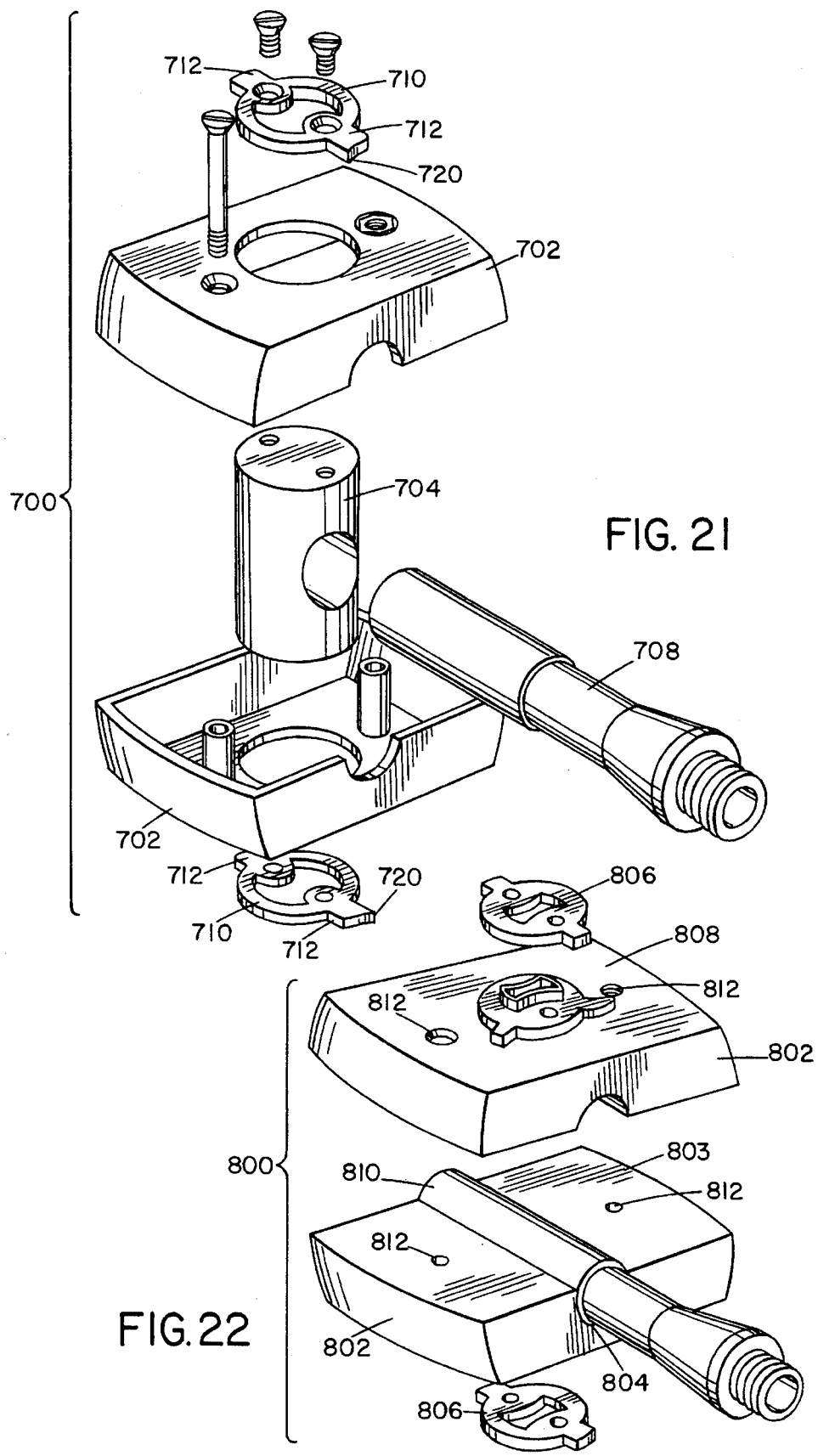

CLIPLESS BICYCLE PEDAL SYSTEM

RELATED APPLICATIONS

This is a continuation-in-part of application Ser. No. 07/947,350, filed Sep. 18, 1992 now U.S. Pat. No. 5,325,738 which is a continuation-in-part of application Ser. No. 07/804,070, filed Dec. 9, 1991, now abandoned.

BACKGROUND OF THE INVENTION

Mountain bikes have overtaken road bikes in popularity over the past few years, with sales of mountain bikes exceeding those of road bikes by at least 4 to 1. In an attempt to keep pace with prior advancements in road bike technology, and to serve the new demand created by the popularity of mountain bikes, advanced equipment and materials are being developed within the bicycle industry to improve speed, safety and pedalling efficiency of mountain bikes. With the exception of lightweight composites and high-tech metals to decrease the overall weight of the bicycle, the single most significant improvement in bicycle accessories is the clipless pedal.

Clipless pedals have been available for road bikes, both for racing and touring, for many years. They provide increased comfort and decreased weight as compared with old style bicycle clips and pedals. Several disadvantages of prior clipless pedal systems were eliminated by the clipless pedal system disclosed in U.S. Pat. No. 4,942,778, issued Jul. 24, 1990 to the present inventor. One of the major disadvantages of earlier pedals was that the locking mechanism was in the pedal itself, limiting engagement of pedal and cleat to only one side of the pedal. As disclosed in the '778 patent, the locking mechanism is in the cleat which attaches to the sole of the shoe such that the mechanism is recessed and, thus, protected from damage.

Mountain biking introduces additional concerns beyond those for road bikes. The pedal bodies themselves are broader because they must bear a considerable amount of stress and strain when riding in rough terrain and during sudden changes of direction. Also, dirt and debris can build up on the pedals and in the cleats when riding off-road or in muddy conditions, so considerations must be made to avoid jamming the locking mechanism so that it will not engage or disengage when desired. Finally, because a rider may wish to leave his or her feet free when riding in rough terrain, it may be preferable to provide for a choice between locking the cleat and pedal together and riding "unattached". Thus, in a race situation, for example, the rider could be locked in when riding in areas where the course is predictable to achieve maximum pedalling efficiency, then release the pedals when he or she wants to be sure that a foot will be available to push off of an obstacle, to pivot in a sudden turn or to prevent a fall.

The clipless mountain bike pedals that are currently available, such as the Shimano SPD, the Time™ TMT and the LOOK™ "Moab" and "Nevada", among others, are bulky and complex, with spring mechanisms that require adjustment of the tension and which could become difficult to engage when caked with mud. Further, these pedals limit all but a very slight angular mobility of the foot (rotation of less than 10°). This limitation is problematic because, while pedalling, mechanics are such that the rider's lower leg rotates. If the foot is fixed it forces the knee and its supporting tendons and ligaments to absorb this rotation, leading to chronic knee or ankle pain. In addition, mobility is especially needed in mountain bike riding where the rider frequently must shift his or her weight to negotiate rough terrain and sharp turns.

SUMMARY OF THE INVENTION

An object of the present invention is to provide a clipless bicycle pedal system which is sturdy enough to meet the rigorous demands of mountain biking yet is easy to use.

Another object of the present invention is to provide a cleat for use with clipless bicycle pedals which is easy to engage and disengage and is resistant to effects of dirt or debris which might otherwise damage or incapacitate a locking mechanism.

Still another advantage of the present invention is to provide a cleat for use with clipless pedals which is small enough to be substantially retained within the recessed area in the soles of commercially-available mountain bike shoes so that it is generally protected from impact and does not interfere with walking or pedalling a flat pedal.

Yet another advantage of the present invention is to provide a clipless pedal for bicycles which can be made with either one side or two sides which can engage the cleat.

Another object of the present invention is to provide a clipless bicycle pedal which permits angular mobility of the foot to prevent knee or ankle strain or injury.

In an exemplary embodiment, the clipless pedal system for mountain bikes comprises a generally circular pedal body, at least one side of which has a mushroom or T-shaped extension which is created by either forming a larger diameter head over a small diameter neck or by forming grooves or slots in the extension slightly below its top, with the grooves being the equivalent of the neck. In either case, a head is formed which will be used to engage the cleat. The cleat consists of a mounting plate which can be attached to the sole of mountain biking shoe, preferably within a recessed area, and has a generally open interior of sufficient dimensions to permit insertion of the head therein. Engaging means extend inwardly (laterally) at a spacing corresponding to the head of the extension. The engaging means can be inserted into the neck of the extension to catch just below the head of the extension. One or more spring tabs may be used to releasably lock the cleat and pedal extension together once the head is in position with respect to the engaging means. In one embodiment, the inwardly extending engaging means are made of a resilient material so that separate spring tabs are not required.

In one embodiment of the pedal system, the head of the pedal extension is a plate of predetermined thickness which is generally rectangular with slightly rounded ends. The head is disposed on the neck at an angle to a line parallel to the spindle on which the pedal is mounted. The angle corresponds to the amount of rotation necessary to engage and disengage the cleat and pedal. The corresponding cleat has L-shaped rails extending downward from a mounting plate, i.e., a downward extension with a lateral extension at its lower edge. The spacing of the lateral extensions of the rails matches the narrowest dimension of the head (between the two flat sides) to permit insertion of the head into the space between the rails when the rider's foot is rotated at the predetermined angle. Return of the rider's foot to normal riding position catches the corners of the head within the rails. By sliding the head toward the rearmost position in the cleat, a spring flap in the cleat plate pops out near the front-most portion of the head and locks it in place. Alternately, the head can be inserted into the rails at their front ends, then slid rearward until the spring flap locks the head in place. In each case, for disengagement, the rider's foot is rotated until the flat sides of the head are parallel with the rails, and the foot can be pulled away, releasing the hold on the head.

In an alternate embodiment, the head is substantially rounded, however, it may also be flattened on two sides. A pair of spring loaded tongues or wires are mounted in the cleat and provide inward-directed forces. When the pedal extension is inserted into the space between the spring-loaded devices they expand to slide over the head then resile inward to catch the neck. The grooves or other means by which the head is formed do not continue fully around the neck's diameter. The limited capture area permits release of the spring-loaded devices by rotating the rider's foot until the devices are out of the groove (or out from under the head) allowing the rider to lift his/her foot to release the pedal.

A second alternate embodiment provides an add-on pedal extension to existing pedals so that the same cleat and engaging means as in the prior embodiment of the invention can be used.

A third alternate embodiment is similar to the first embodiment in that the head is rectangular, forming a T-shaped extension, however, the rectangle is relatively narrow such that two tabs extend in opposite directions from the supporting neck, and the head is parallel to the pedal spindle. The tabs are slightly rounded, as in the first embodiment. The tabs can be inserted and locked into place by two methods. The first is to slide the tabs into the rails of the cleat by bringing the cleat in contact with the head then sliding the shoe with the cleat forward to engage the tabs within the L-shaped rails of the cleat. The L-shaped rails need not be of continuous construction, but can consist of a combination of guide rails and a T- or mushroom-shaped screw which is screwed into the plate of the cleat, where the screws are the primary stress-bearing component. When the foot is moved fully forward to the point where the front of the neck hits a stop on the cleat and a spring tab pops up to catch the back of the neck. The pedal and cleat can also be engaged by aligning the head of the pedal with the cleat when the rider's foot is at an angle such that the ends of the tabs are situated between the rails. By rotating the rider's foot back to a generally perpendicular line with respect to the pedal spindle, both tabs will slide within the L-shaped rails. If the foot is not already fully forward, the foot is moved forward until the stop contacts the neck and the spring tab pops up.

The stop on the cleat of the fourth embodiment is eccentrically-shaped, i.e., a cam, which performs the same function as in the previous embodiment but is adjustable to ease manufacture by permitting looser tolerances within the locking mechanism. A safeguard to prevent rotation of the rider's foot to a point where it hits the spokes of the rear wheel is provided in the form of a crescent-shaped cam stop located on the surface of the pedal just behind the head.

The cleat's spring tab is a resilient material which protrudes through an opening in the cleat plate at the front of the cleat, providing a force perpendicular to the cleat plate. The resilient material may be an elastomer which is compressible, or can be a plastic or polymer, such as nylon, which is formed in a spring-like form, either of which will be pushed inward toward the cleat plate when pressure is applied but which resiles outward when the pressure is released. The top surface of the spring tab is preferably metal to provide durability, with the resilient polymer-material providing a backing for the metal.

The locking mechanism of the first and fourth embodiments is interchangeable between the pedal and the cleat. Specifically, the L-shaped rails or equivalent can be located on the pedal and the head/neck extension can be located on the cleat. Since there is no complicated mechanical spring-activated mechanism involved in either half of locking mechanism it is lightweight and does not require a large pedal or cleat. For example, rails as described above can be placed on both sides of the pedal without a significant weight or size increase, and the extension can be substantially recessed within the sole of the rider's shoe so that it does not affect the rider's ability to walk while wearing the shoes to which the cleat is attached.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which:

FIG. 18 is an exploded perspective view of a pedal according to a sixth embodiment;

FIG. 19 is a top view of a cleat according to a sixth embodiment;

FIG. 20 is an exploded side view of the cleat of the sixth embodiment;

FIG. 21 is an exploded perspective view of the pedal according to a seventh embodiment; and FIG. 22 is an exploded perspective view of the pedal according to an eighth embodiment.

DETAILED DESCRIPTION OF THE PREFERRED EMBODIMENTS

In each embodiment, the pedal body is a generally flat block which may have any shape which will provide enough surface area in a single plane for reasonable disbursement of the force placed on the pedal by the rider's foot. In the embodiments illustrated in FIGS. 1, 2, 3, 4 and 8 the pedal is a ring with plate spanning its interior and connecting the right to the extension which is one-half of the locking mechanism. The plane 13 at which the sole of the shoe contacts the pedal, indicated in FIGS. 2, 7, and 8 lies across the upper (or lower) surface of the ring, the ring being symmetrical when its width is bisected along a plane running through the center of the ring's width and parallel to the plane of contact.

In the embodiments shown in FIGS. 12–20, the pedal body is a block which may be solid throughout or a closed structure with a partially hollow interior. The sole of the rider's shoe contacts the upper surface, the block being symmetrical top to bottom, and the upper surface being whichever of the pedal contact surfaces that is oriented upward when the rider engages the pedal. The block may have squared or rounded edges, and may have beveled corners.

While the pedal is described as having its top and bottom as the broadest planes of the block, it should be understood that the pedal rotates around the spindle and may not be oriented with the contact planes running completely horizontal, especially if the rider's foot is not engaged. Nonetheless, references to top, bottom, front, back and sides shall be described as if the rider's foot is engaged and the sole of the rider's shoe contacts and is parallel to the top of the pedal.

The locking mechanism is disposed on an extension which is located at the diametric center of the pedal body. In the first embodiment, the extension is T-shaped or mushroom shaped, where such a shape is created by either forming a larger diameter head over a smaller diameter neck, or by forming grooves or slots in a base which protrudes above the contact plane of the pedal so that a head is defined above the grooves, and the grooves or slots become the equivalent of the neck.

Figure 8:
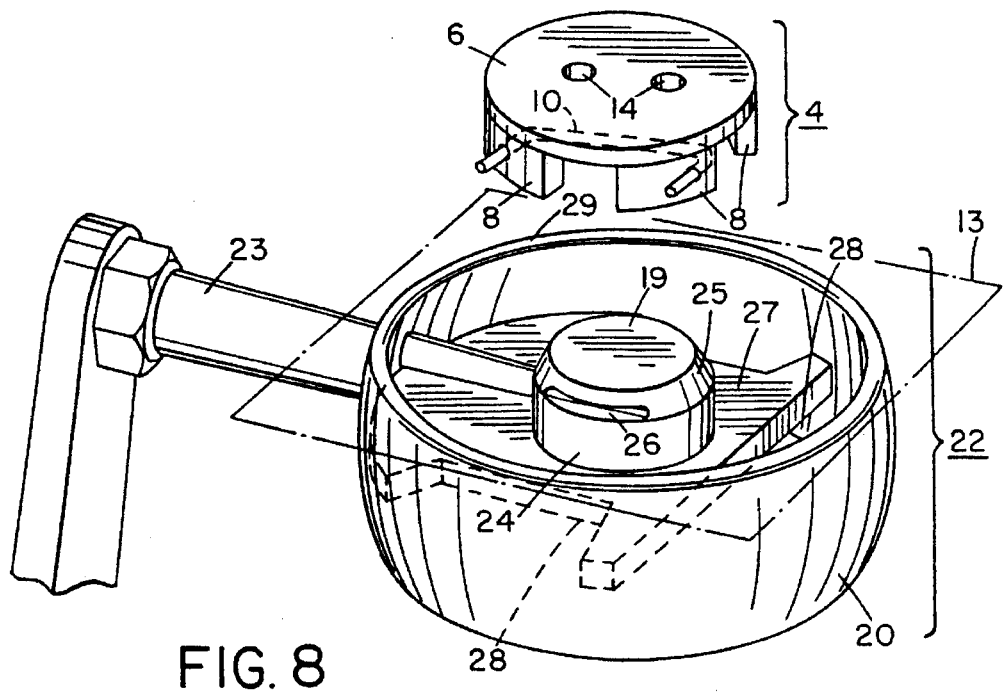
FIG. 8 is a perspective view of the pedal and cleat.

As illustrated in FIG. 8, the first embodiment of the clipless mountain bike pedal system consists of two primary components: pedal 22 and cleat 4. Pedal 22 is illustrated in detail in FIGS. 1–3.

Figure 1:
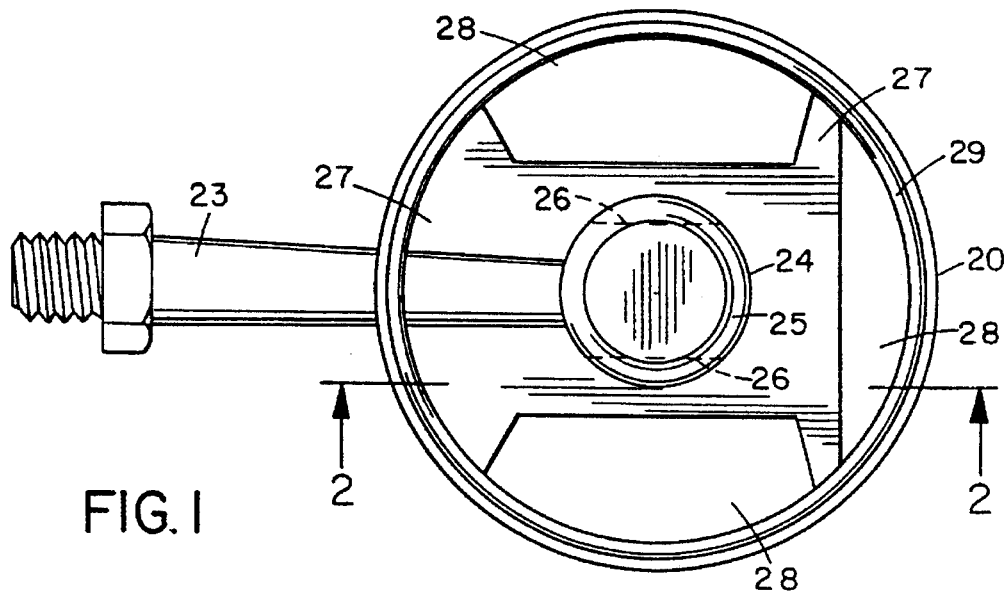
FIG. 1 is a top plan view of a mountain bike pedal according to the present invention.
Figure 2:
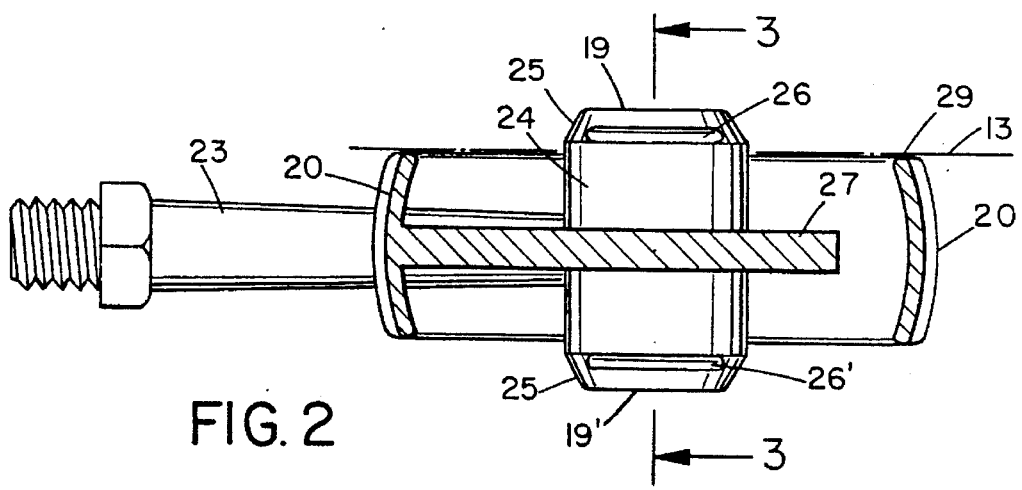
FIG. 2 is a cross-sectional view taken along line 2—2 of FIG. 1.

Pedal 22 is generally circular in shape with a ring 20 centered on a cylindrical extension 24. Joining ring 20 to extension 24 is plate 27 which intersects both ring 20 and extension 24 at their approximate lateral centers, as shown in FIG. 2. The height of extension 24, from 19' to 19, is greater than the width of ring 20 so that it extends somewhat higher than the rim 29 of ring 20 to facilitate insertion in to cleat 4.

Formed in the circumferential sides of extension 24 are grooves 26 which lie in a plane parallel to plate 27. Generally, two grooves 26 of a finite length are placed so that they are diametrically opposite each other. It is possible to use more grooves in an equally-spaced relationship, e.g., three grooves at 120° spacings. As illustrated in each of the figures, two grooves 26 are located at the leading and trailing edges of extension 24. It is also possible to locate the grooves 26 at the inner side and outer side of extension 24 relative to the spindle 23 as long as the cleat is similarly oriented.

Figure 7:
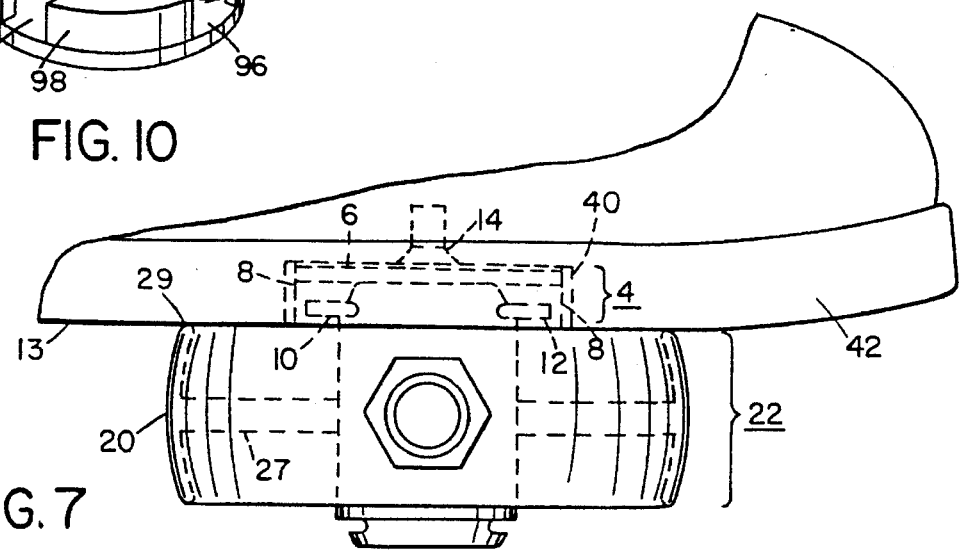
FIG. 7 is a side view of a rider's shoe with the cleat attached and the pedal engaged with the cleat.

Cleat 4 has a flat plate 6 by which it is mounted via screw holes 14 within the recessed area 40 of sole 42, which is commonly available in mountain bike shoes, as shown in FIG. 7. Attached perpendicular to plate 6 are extension tabs 8 which retain spring wires 10 and 12 so that they span the interior cavity 50 of cleat 4. A latching mechanism can be used in place of the spring wires 10 and 12. Anything that can provide releasable engagement with the grooves will serve the same purpose as the spring wires 10 and 12. For example, there are multiple latching mechanisms disclosed in U.S. Pat. No. 4,942,778.

Figure 5:
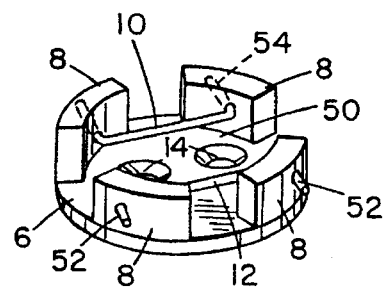
FIG. 5 is a perspective view of a first embodiment of the cleat of the present invention.

FIG. 5 illustrates the details of cleat 4. Flat plate 4 is shown as circular, but its shape is not critical except to the extent that it must fit within recessed area 40. The size of cavity 50 is determined by the diameter of extension 24 of the pedal. The upper portion of extension 24 must fit within cavity 50 so that grooves 26 can be engaged by spring wires 10 and 12 to lock the pedal and cleat together. The length of tabs 8 are sufficient to retain spring wires 10 and 12 at a distance from plate 6 so that tops 19 or 19' of extension 24 are generally in contact with plate 6 when the pedal and cleat are engaged.

Tops 19 or 19', however, do not bear the entire weight of the rider, nor do the spring wires 10 and 12. The relative heights of extension 24 and ring 20 are such that when the pedal and cleat are engaged, the sole 42 of the rider's shoe contacts the rim 29 of ring 20, so that the rider's weight is distributed over the ring 20. Some weight, however, still may be placed on the tops 19 and 19'.

The top portions of extension 24 have a chamfer 25 which assists in centering the extension 24 within the cleat 4. Once the two elements are centered, the chamfer 25 gradually spreads the spring wires 10 and 12 until they resile into grooves 26 to lock the pedal to the cleat.

Figure 3:
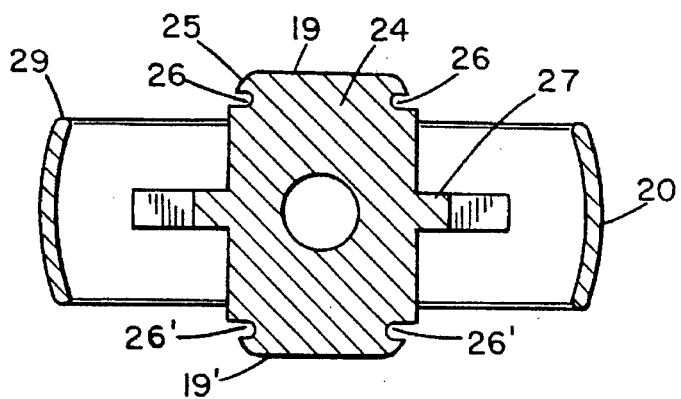
FIG. 3 is a cross-sectional view taken along line 3—3 of FIG. 2.

The pedal embodiment illustrated in FIGS. 2 and 3 has a symmetrical construction so that either side of the extension 24 can be inserted into cleat 4 thereby engaging either grooves 26 or 26' with spring wires 10 and 12.

Figure 4:
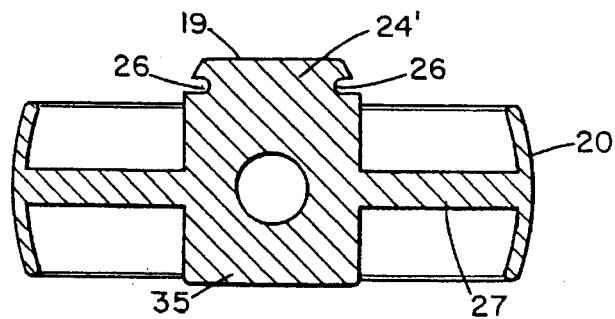
FIG. 4 is a cross-sectional view similar to that of FIG. 3 illustrating an alternate embodiment.

FIG. 4 illustrates an alternate one-sided pedal which permits the rider to choose between locking the cleat into grooves 26 or letting the feet remain free by using side 35 for pedalling. Such an option may be desirable to prevent falling or injury from sudden obstacles or hazards. Also, when a mountain bike is being ridden in traffic, it may be desirable to leave at least one foot free to allow rapid response to sudden stops or turns by cars or other bikes.

Figure 9:
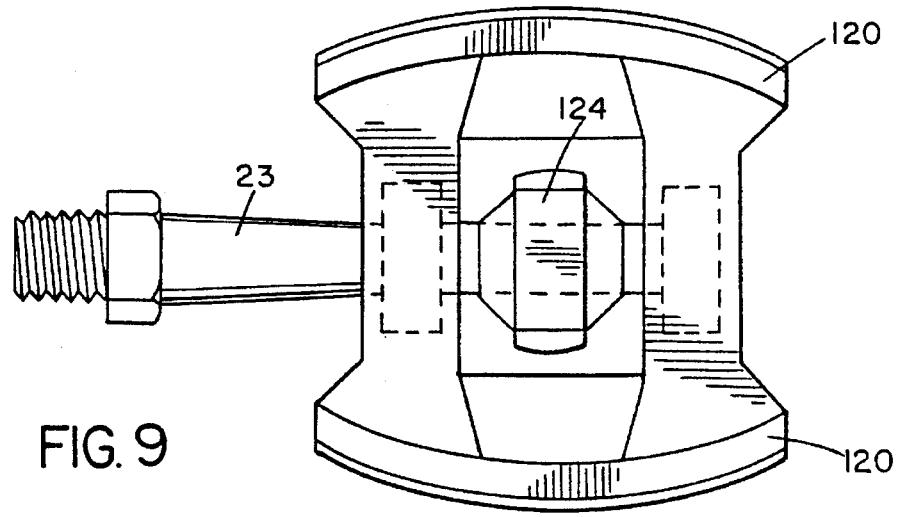
FIG. 9 is a top plan view of an alternate pedal configuration.

The ring 20 is curved slightly inward at the rim 29, and rim 29 is rounded. This reduces the chance of injury if the rider slips on the pedal or hits the pedal against his or her leg. The circular configuration of the pedal 22 and its rounded edges are not essential to the successful function of the locking mechanism described herein. These features are merely included as a desirable feature of a mountain bike pedal. FIG. 9 illustrates a possible configuration in which both extension 124 and ring 120 are squared off. Further, in embodiments described below, the pedal is a block with solid surfaces in the contact plane.

Figure 6A:
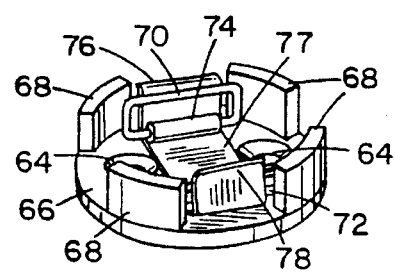
FIG. 6a is a perspective view of a second embodiment of the cleat and FIG. 6b is a side view of the cleat of FIG. 6a engaged with the pedal.
Figure 6B:
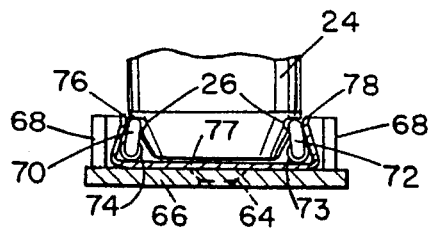

A second embodiment of the cleat is illustrated in FIGS. 6a and 6b. Plate 66 is similar to plate 6 of the first embodiment in that it provides means for mounting the cleat on the shoe sole 42. Tabs 68 provide support for the mechanism. Links 70 and 72 are metal "rings" which are held down to plate 66 by channels 74 and 73, respectively, so that links 70 and 72 pivot within the channels. A spring plate 77 spans plate 66 and has arms 76 and 78 which extend slightly inward from perpendicular to plate 66 to press against links 70 and 72 to provide an inward compression, urging links 70 and 72 toward the center of the cleat. When a body 24 of pedal 22 is inserted into the cleat, it presses outward on links 70 and 72 to overcome the inward compression of the spring arms 76 and 78. Once grooves 26 are aligned with the upper legs of links 70 and 72, spring arms 76 and 78 cause the links 70 and 72 to lock the pedal in place. Spring plate 77 may be made of spring metal or any resilient plastic or polymer.

Both plates 6 and 66 are shown with mounting holes 14 and 64, respectively. Standard commercially-available mountain bike shoes have a pair of slots within recessed area 40 which can be used for mounting cleats. The spacing of mounting holes 14 and 64 is compatible with this standard, but may be adjusted as new industry standards develop, as may the orientation of the mounting hole.

When the rider wishes to disengage the pedal, the foot is rotated so that the end of groove 26 initiates depression of the spring. As the foot is further rotated, spring wires 10 and 12, or links 70 and 72 become fully expanded so that the foot may be lifted off the pedal. By varying the length of the grooves, the point at which the end of the groove initiates depression of the springs may be predetermined. The amount of rotation of the foot required to disengage the pedal can be optimized to prevent unintentional disconnection while still allowing intentional removal of the foot with minimal rotation, typically 10° to 30°. Groove length and depth are large enough to retain the connection against sudden motions of the rider's foot which are encountered, for example, when climbing hills, jumping obstacles, or when starting from a full stop, but not so great as to make disengagement of the pedal and cleat overly difficult.

While the interior of the cleats may be generally enclosed, such that a continuous ring runs around the plate, tabs 8 and 68 are configured so that openings are provided to minimize accumulation of dirt and debris within the cavity. Such accumulations present the risk of clogging the locking mechanism, and an open configuration allows the dirt and debris to pass through, or at least makes it easy to remove.

Similarly, plate 27 of pedal 22 has various openings 28 therethrough. Openings 28 permit dirt and debris to pass through the pedal to avoid build-up of material.

The materials from which the cleat and pedal are made can be any of a number of materials commonly used in the industry including durable, high-impact plastics and polymers, and various lightweight metals.

Figure 10:
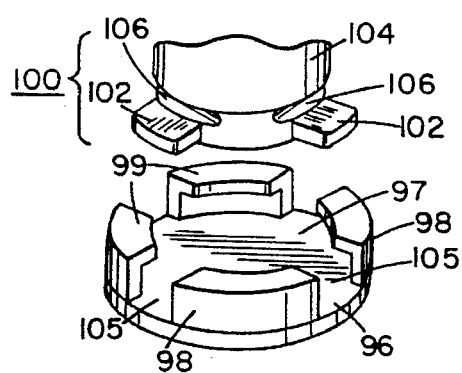
FIG. 10 is a third alternate pedal/cleat configuration.

In a third embodiment of the cleat/pedal combination illustrated in FIG. 10, the cleat comprises a plate 96 with extensions 98 which form quarter plates 99 parallel to plate 96. The body 104 of pedal 100 has grooves 106 aligned in a plane parallel to plate 96 when the pedal and cleat are engaged. Body 104 has tabs 102, either two or four in number, which are slightly narrower than the spacing 105 between quarter plates 99. When the rider's foot is oriented in the proper direction for riding, the tabs 102 and spacings 105 are slightly off-angle, e.g., 10° to 15°. When the rider desires to engage the pedal and the cleat, he or she rotates the foot until the tabs 102 are aligned with spacings 105 and inserts the tabs 102 into the spacings. When the foot is rotated back to its natural riding position, the tabs 102 will be retained within cavity 97 by quarter plates 99.

Other numbers of plates 99 and tabs 102, e.g., three, five or six, may be used as long as the spacing permits alignment of the tabs and spacings.

Figure 11:
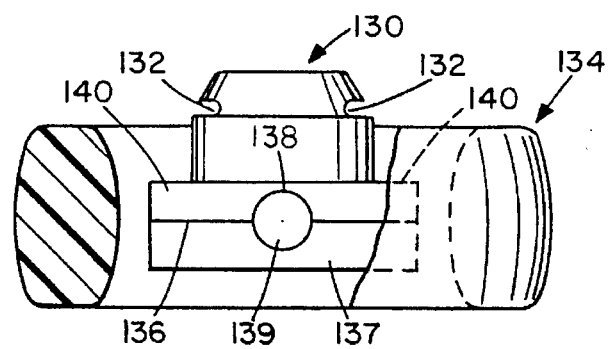
FIG. 11 is a side view, partially cut away, of an embodiment of the invention for attachment to existing mountain bike pedals.

An add-on pedal attachment is illustrated in FIG. 11. This attachment 130 permits operation identical to that of the full pedal herein above described. Grooves 132 are disposed in the upper portion of attachment 130 with means for affixing the attachment 130 to pedal 134 at the other end 136. A channel 138 fits around axle 139 of pedal 134 and is held in place by plate 137, attached by way of screws 140. This provides one-sided operation. For two-sided operation, identical attachments 130 can be bolted together around axle 139.

Figure 12:
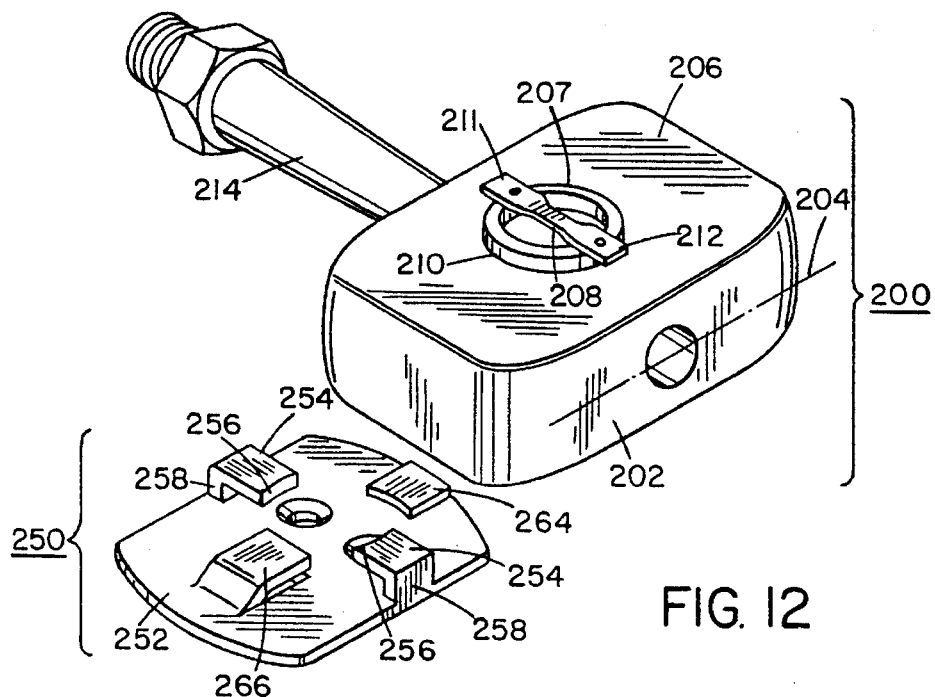
FIG. 12 is a perspective view of a fourth embodiment of the locking mechanism on a pedal/cleat combination.

As illustrated in FIG. 12, the fourth embodiment of the present invention includes pedal 200 and cleat 250.

Pedal 200 consists of a solid block 202 which is symmetrical around a plane which bisects the pedal along line 204. Extending outward from each contact plane 206 is the first half of the locking mechanism of the present invention. A single extension 207 will be described since the extensions are identical on both sides of the pedal bock 202.

The extension 207 comprises a head 208 and neck 210. The head 208 is generally rectangular and is narrow in one direction when compared with the diameter of neck 210, so that two tabs 211 and 212 are defined which extend beyond the neck 210, in a direction parallel to the pedal spindle 214. The ends of the tabs 211 and 212 are slightly rounded, and it may be desirable to bevel the edges to facilitate engagement of the head in the corresponding rails.

The second half of the locking mechanism comprises a flat plate 252 with a width generally corresponding to the width of head 208. At each side of the plate 252 a rail 254 with an L-shaped profile extends away from the plate 252 a short distance corresponding to the thickness of head 208. Rails 254 are at least as long as the narrowest dimension of head 208 and may be as long as one-half the length of the plate 252 overall so that a portion of the plate 252 has no rails. The spacing between the feet 256 of rails 254 is narrower than the width of the head 208, and the spacing between the legs 258 of rails 254 is slightly larger than the width of head 208 so that head 208, when inserted into the space between the rails, can be engaged by the rails 254.

Figure 13A:
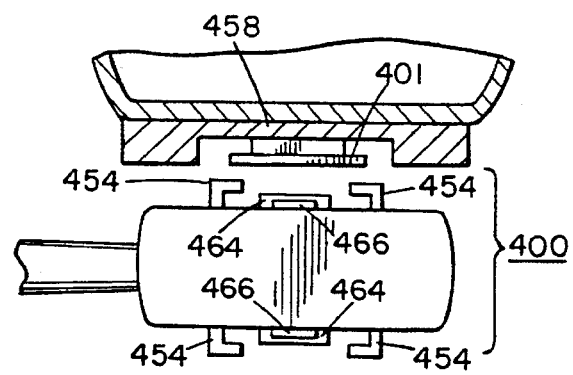
FIG. 13a is a top view of the locking mechanism in an unlocked position and FIG. 13b is a top view of the locking mechanism of FIG. 12 in a locked position.
Figure 13B:
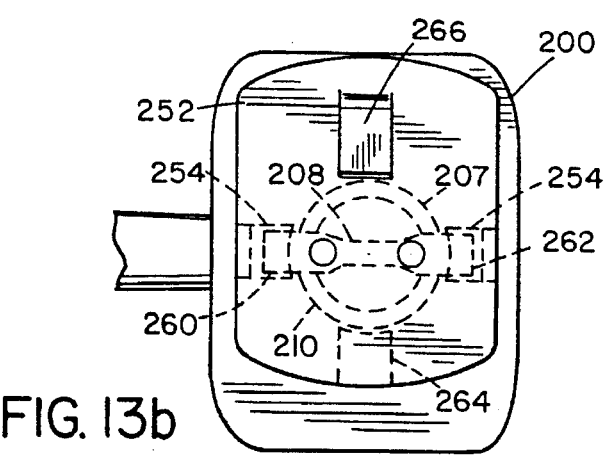

In this embodiment, the head 208 can be engaged by the rails 254 by rotating head 208 with respect to the rails to a point where the farthest distance across the head, i.e., from 260 to 262 in FIGS. 13*a* and 13*b*, will fit between the rails 254. By placing head 208 so that it contacts plate 252, then rotating head 208 back to its normal position perpendicular to rails 254, the head 208 is held in place by the rails.

A stop 264 is provided at the rear of plate 252 to prevent the head 208 from sliding out of the rails 254 at their front end. The stop 264 also provides guidance for placement of the head 208 with respect to the rails 254 before the two are engaged. Stop 264 contacts the rear most edge of neck 210. When this contact is made, a spring tab 266 located in plate 252 toward the front of the rails 254 pops outward to catch the front-most edge of the neck 210. Spring tab 266 is depressed during the alignment step when the head 208 is not fully forward in the rails, and resiles once the force that pushes it back toward plate 252 is released. Stop 264 may also be positioned to catch the inside of neck 208, or can be made in a shape that will mate with a corresponding opening in the neck, or some other similar variation. The key is that stop 264 provides a limit to further forward movement of the head once it has been positioned inside the rails. Similarly, spring tab 266 need not be limited to contacting the front-most edge of the neck 210. Alternatively, spring tab 266 can resile so that it is inside the neck or mates with a corresponding opening in the neck. Also, spring tab 266 can be a resilient button, either spring loaded or made of a resilient material, such as urethane or rubber, which can be depressed then will resile once the pressure is released.

Spring tab 266 locks the head 208 within the rails 254 until the extension 207 is rotated to a point where the tabs 211 and 212 are completely free from the rails. At this point, the extension 207 and the rails 254 can be separated to disengage the locking mechanism.

The angle of rotation for engaging and disengaging the locking mechanism is on the order of 30°, but may be varied within a range of 10 to 40 degrees according to the rider's needs. This permits a normal range of rotation of a rider's foot during pedaling without accidental release, but does not require so much rotation that it is difficult to engage or disengage the mechanism. The preferred direction of rotation is with the rider's heel pointing outward and the toe pointing inward. Nonetheless, it would be possible to set up the locking mechanism to engage or disengage when the rider's heel is rotated inward. This latter arrangement produces a greater risk of the right foot hitting the chain or chain guard.

Figure 14:
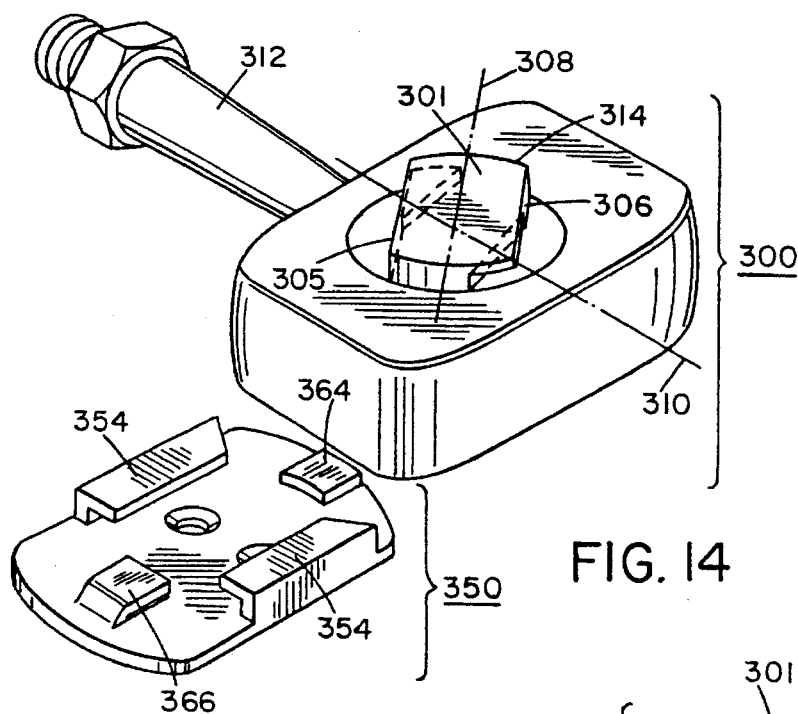
FIG. 14 is a perspective view of the locking mechanism according to a fifth embodiment.
Figure 16:
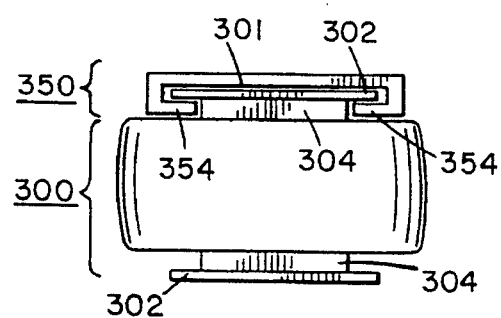
FIG. 16 is a side view of a locking mechanism according to the fifth embodiment.
Figure 15A:
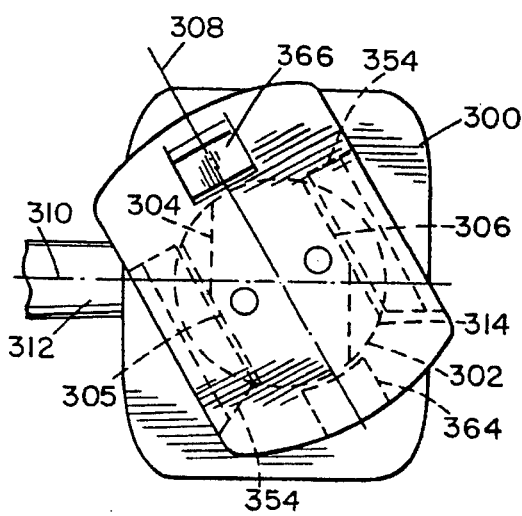
FIG. 15a is a top view of the fifth embodiment in an unlocked position and FIG. 15b is a top view in a locked position.
Figure 15B:
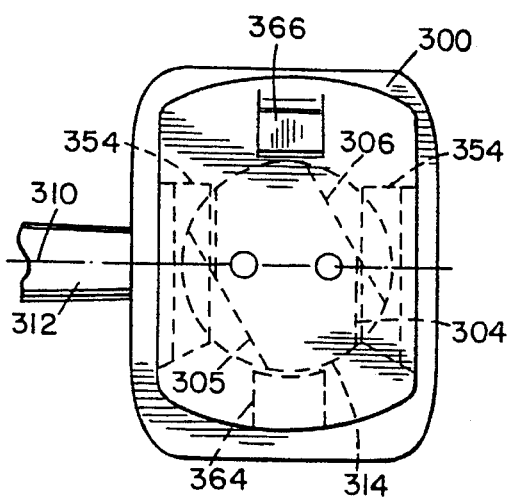

In a fifth embodiment, the rail and plate structure are the same as above, and extension 301 comprises a head 302 and a neck 304. The neck is formed by creating grooves in a generally circular base at a pre-determined distance from the top of the extension to create head 302 with a given thickness corresponding to the spacing between the cleat plate and the horizontal portion of the rails 254, as illustrated in FIG. 16. Head 302 has the same maximum diameter as the circular base, which is wider than the narrowest spacing between the rails 354, but narrower than the widest spacing between the rails 354. Head 302 is flattened on two sides 305 and 306 which are on opposite sides of a line 308 running along the maximum diameter of head 302. The distance between sides 305 and 306 is slightly less than the narrowest spacing between rails 354. The portion of the head 302 which overhangs the neck 304, and which will be captured within the rails 354, is illustrated in FIGS. 14, 15*a* and 15*b* as being opposing corners of the generally rectangular head. The undercut portion of the neck 304 need not be limited to the corners illustrated, but can extend completely around the extension or some portion thereof. For normal rotation of the foot during pedalling, it is desirable to extend the groove at least a short distance in both directions beyond the corners illustrated, to permit a small amount of rotation in both directions without releasing the connection. This will minimize strain on the rider's knees.

The orientation of head 302 is such that line 308 is at an angle of approximately 60° to a line 310 running through spindle 312, shown in FIG. 15*b*. In order to engage head 302 within rails 354 the rails and plate structure is rotated 30° with respect to the rails 354. The orientation of the head can be varied to provide a range of rotation to disengage, as in the above embodiments. In this rotated position, the head 302 will be parallel to and may be placed between rails 354. Rotation back to the normal orientation (with the rider's foot generally perpendicular to the pedal spindle) will capture the head 302 within the rails 354. As in the fourth embodiment, if the head 302 is not fully forward it must be slid forward until it contacts stop 364. At this point of contact, spring tab 366 will pop up to catch and hold the rearmost edge of extension 301.

An alternate means for engaging the locking mechanism according to the fifth embodiment is to bring the leading edge 314 of extension 301 into contact with plate 352 at the rearmost end of rails 354, then sliding the extension straight forward, catching head 302 within rails 354, as in FIG. 15*b*.

Stop 364 will halt further forward movement when the head 302 is properly located and spring tab 366 will resile to capture the rearmost edge of extension 301.

For release of the locking mechanism, one of the extension 301 and the rails 354 are rotated so that they are approximately 30°, or some other pre-selected angle, with respect to each other. This will align the head 302 to be parallel with the rails, as in FIG. 15*a*, so that extension 301 and rails 354 can be separated.

Figure 17:
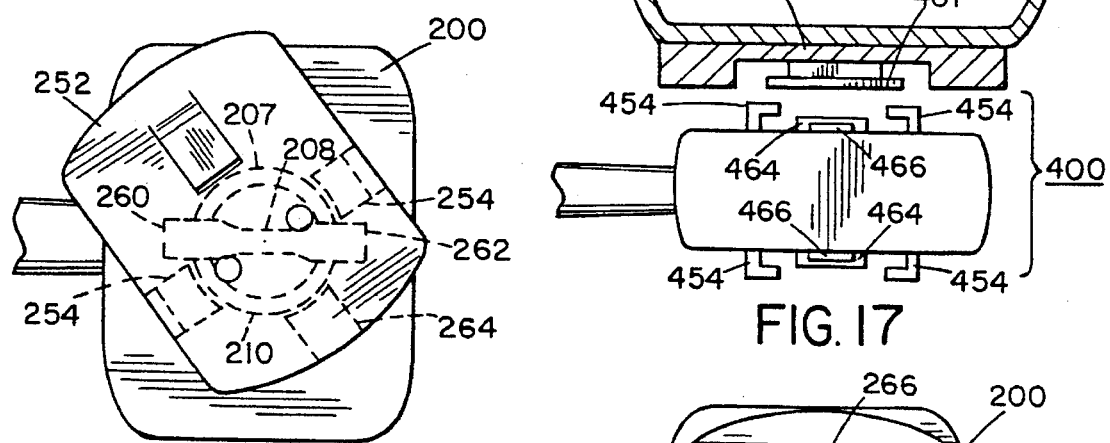
FIG. 17 is a side view of the pedal/cleat combination with a reversed location of the extension and rails.

While the above embodiments are described in terms of the extension being attached to the pedal and the rails attached to the cleat which attaches to the rider's shoes, the two halves of the locking mechanism can be reversed, with the rails 454, stop 464 and spring tab 466 on both sides of the pedal 400 and the extension 401 attached to a cleat plate 458 attached to the rider's shoe, as illustrated in FIG. 17. The common elements of each embodiment, and an important aspect of the invention, is the simple, symmetrical head on the extension with a groove or indentation thereunder which can be captured, either under a set of laterally projecting rails or other lateral protrusions, and can be released by rotation of the extension with respect to the lateral protrusion to remove the head from under the lateral protrusion.

The sixth embodiment, illustrated in FIGS. 18–20, is a variation on the fourth embodiment that incorporates variations which facilitate manufacture of the cleat and pedal and which allow the weight of the overall system to be significantly reduced. The pedal 600 is formed of two half-shells 601 which are mirror-images of each other, each of which has a semi-circular channel 602 at the lower edge of its inner side 603 through which the spindle 604 passes. As in the fourth embodiment, the pedal 600 is symmetrical top to bottom. The bearing sleeve 606 of spindle 604 fits closely within the channels 602 so that when the two half-shells 601 are assembled, the bearing sleeve 606 is held in place within the bore created by the combination of channels 602 within the pedal 600. The two half-shells 601 are assembled by two screws 605 which pass through a bore 607 in one pedal half and screw into a threaded hole, or matching nut 613 within a recessed area 611, in the other pedal half. The bores 607 are countersunk so that the screws' heads are flush with the top surface 608. Contained within the bearing sleeve are two sealed-cartridge bearings and a needle bearing (not shown). While this is the preferred configuration, other bearing combinations may also be used. Spindle 604 is stainless steel or titanium, as is known in the art.

Each pedal half-shell 601 is molded from a lightweight, impact resistant plastic or polymer, such as Ultem™. On the top surface 608 of each pedal half-shell 601, a neck portion 609, a circular area raised above the top surface 608, is formed with an additional raised ridge or lip 610 at its center. Lip 610 provides additional stability and stress reinforcement for head 612, which has an interior shape which matches the shape of the lip 610. A pair of screws 614 is driven through bores in the pedal half 601 from the inside and screwed into the threaded holes 616 in head 612 to fasten the half-shell 601 and head 612 together. Alternatively, a pair of countersunk holes may be formed in the outer surface of head 612, and threaded holes may be placed in the half-shell 601 to accept the screws. In the former version, the head 612 must be assembled with the half-shell 601 before the two pedal halves are assembled. In the latter, the head 612 can be attached after the pedal halves are assembled.

Head 612 is stainless steel, aluminum, titanium, or some other high-strength, durable metal. The diameter of head 612 is the same as that of neck portion 609 and head tabs 618 extend from opposite sides of head 612, parallel to the spindle 604. The head tabs 618 will cooperate with the rail configuration in a manner similar to that of the fourth embodiment and as will be described in more detail below.

The head 612 is the portion of the pedal 600 which will experience the greatest wear since this is the part that contacts the cleat and resists forces pulling the rider's foot from the pedal. By making the head 612 out of a strong metal and making the rest of the pedal half 601 out of a lightweight plastic, the pedal 600 can be as light as possible while still being durable. When the tabs 618 of head 612 finally wear out, the head can easily be replaced without having to purchase a completely new pedal.

Also molded in the top surface 608 of the pedal half 601 is a cam stop 620, a crescent-shaped extension from lip 610 which prevents the disengagement of the cleat from the pedal when the rider rotates his or her heel inward toward the spokes of the rear wheel. This avoids accidental disengagement in the event that the rider is simply turning his or her heels inward to provide a firmer grasp on the bicycle, and also avoids the risk of catching the rider's heels in the spokes.

An additional feature which may be molded in the top surface 608 is a resistance nub 622 which is a rectangular or trapezoidal extension from the lip 610 opposite the cam stop 620, which cooperates with the spring tab 660 of cleat 650 to provide resistance when the pedal 600 is disengaged from the cleat 650.

An optional feature that may be included in any pedal embodiment is a grease point consisting of a threaded bore 630 which runs from the outer end of the pedal into the channels 602 and/or the bearing sleeve 606. Grease may be injected into the points of rotation between the pedal body 600 and the spindle 604 through bore 630, which a closed during non-use by screw 632 to prevent dirt from entering the bearing assembly. Alternatively, the bore may have straight sidewalls and can be closed with a plug or cap. In its preferred configuration, the threaded bore 630 has a diameter on the order of 1–2 mm. The head of the screw 632 should be flush with the surface of the pedal to avoid damage when the pedal strikes a hard surface.

The cleat 650 is formed from a stainless steel plate or similar metal by stamping, casting or machining. The preferred form of manufacture is stamping, since this process is more economical. The rails which were described in the fourth embodiment are replaced with the combination of a pair of guide rails 652 and T- or mushroom-shaped screws 654 consisting of top portion 656 and stem portion 655. When the cleat and pedal are to be engaged, the head 612 is placed within the guide rails 652 which slope slightly inward to guide the head tabs 618 of head 612 so that they are trapped within the space between the heads of mushroom-shaped screws 654 and cleat plate 651. The mushroom-shaped screws 654 have the same dimensional requirements as the rails of the previous embodiments. Specifically, the screw head or top portion 656 must extend beyond the stem 655 with a thickness and width complementary to the thickness and width of the tabs 618 so that the head tabs 618 fit within the space below the screw heads 656 with sufficient overlap to prevent the head tabs 618 from being pulled from under the screw 656 in a direction perpendicular and away from the cleat plate 651.

In a prototype version, the extension of the screw head 656 from the stem 655 is approximately 1/16" (1.6 mm) and the separation between the two screw heads 656 is about 1.0" (25.4 mm). For the corresponding dimensions on the pedal, the tab width is about 1 1/8" (28.6 mm) end-to-end across the head 612, and the an overhang of each tab over the neck portion 613 is about 1/16" (1.6 mm). The diameter of the neck portion is about 15/16" (23.8 mm). Thus, the locking area defined by the innermost extent of the screw heads 656, the stop 658 and the locking edge of the resilient tab 660 should closely fit the diameter of the neck portion.

The plate 651 is formed with threaded bores into which screws 654 are screwed. This makes it possible to form the cleat plate 651 by stamping the metal as opposed to investment casting or machining, which is considerably more expensive. Another advantage of constructing the cleat 650 as a combination of a plate 651 and mushroom-shaped screws 654 is that the screws are primary wear points. When they become worn, they can simply be replaced without replacing the entire cleat.

The cleat plate 651 is stamped with bores for the mushroom-shaped screws and the cam 658 and an opening 659 for resilient tab 660. Other openings, such as cut-outs 653 serve to decrease the weight of the cleat as well as making it easier to bend up the guide rails 652 after stamping. It may also be desirable to serrate the outer edges of the guide rails 652, as shown, to provide additional traction when the rider is walking. Countersunk holes 663 are formed in the center of the cleat plate 651 to permit attachment of the cleat to the sole of the rider's shoe. As illustrated, two holes are placed laterally across the cleat plate, corresponding to the industry standard SPD mounting pattern. Alternatively, the two screw holes can be placed longitudinally to mount in a shoe with a single lengthwise slot. Additional screw holes or different patterns can also be provided to match any other mounting pattern that might be adopted within the industry.

Resilient tab 660 is a laminated metal layer 661 and plastic "pillow" 663 which fits within opening 659 to create a ramp which can be depressed when the head 612 passes over the ramp from front to back and resile after the head 612 has passed the locking edge 662 of the ramp to trap the head 612 within the locking mechanism.

The corners of the metal layer 661 at the locking edge 662 are slightly rounded, partly to enhance the connection between the plastic pillow 663 and partly to provide a camming action so that, as the rider rotates his or her foot outward, the resistance nub 622 of the pedal slides against the rounded corner gradually depressing the resilient tab 660 while encountering some resistance from the pillow 663. This makes it necessary for the rider to apply slightly more force against the pedal when attempting to disengage the pedal, but prevents the abrupt release that might occur if no resistance were encountered.

The plastic pillow 663 can be formed of nylon or other hard plastic, or of polyurethane or similar compressible material. With the harder material, a flat spring-like configuration gives the necessary resilience. Alternatively, the polyurethane pillow is itself compressible and resilient, so the desired resilience can be obtained by using a ramp of polyurethane underneath the metal layer 661. As illustrated, a continuation of the pillow 663 forms a ramp 668 forward of the front edge of the cleat plate 651. This ramp 668 provides a lower resistance surface at the initial entry point for engaging the cleat and the pedal.

The stop 658 is another feature that is replaceable since it screws into the cleat plate 651 as opposed to being formed integrally therewith. The stop 658 can be circular so long as it is mounted off-center, i.e., a cam, so that a range of different radii is available. This eccentricity provides adjust-ability of the distance D between the stop 658 and the resilient tab 660. The ability to adjust this distance loosens the manufacturing tolerances required to provide a good fit of the neck portion 613 within the space between the stop 658 and the spring tab 660 with the spring tab fully resiled. In addition, if the rider desires a little bit of play between the cleat and pedal, distance D can be increased. Adjustment is effected by turning the screw 669 that holds stop 658 in place to cause a larger or smaller radius to contact the neck portion 609, thereby increasing or decreasing D, respectively. It is also possible to compensate for wear on the cam stop by rotating it to a larger radius at the contact point. Since the stop 658 is a significant wear point on the cleat, it can be ultimately be replaced without replacing the entire cleat.

A seventh embodiment of the pedal operates the same as the sixth embodiment with some minor variations, and can be used with the cleats described in either the fourth or sixth embodiments.

The pedal 700, shown in FIG. 21, is formed from two durable plastic half-shells 702 which are inserted over a central barrel 704, made of aluminum, stainless steel, or titanium, which retains the bearing sleeve 706, its corresponding bearings and the spindle 708. The tabs 712 of head 710 are formed either integrally with the barrel 704 or as a separate end cap which is then attached to the barrel 704 by countersunk screws.

As an alternative to the cam stop disclosed in the sixth embodiment, a small tooth 720 is formed at the edge of the tab 712 which corresponds to the inside of the pedal closest to the spindle 708. The tooth 720 prevents the rotation of the rider's foot which would result in the rider striking the rear wheel by catching on the stem of the mushroom-shaped screw 654 (in the sixth embodiment), or equivalent rail-structure, when the left foot is rotated counterclockwise or the right foot is rotated clockwise.

The eighth embodiment illustrated in FIG. 22 provided an inexpensive pedal construction which eliminates the need for a separate bearing sleeve. The number of bearings can be decreased or eliminated altogether if an appropriate pedal material is used.

In the eighth embodiment, the pedal 800 consists of two half-shells 802 which are molded with center channels 804 smaller than those of pedals of previous embodiments, for example, the sixth embodiment. The diameter of the channels 804 closely fits the outer diameter of the bearing end of the pedal spindle. For assembly, the metal heads 806 may be attached to the top surfaces 808 of each half-shell, then the pedal spindle 810, is placed within the center channel 804 of one of the half-shells 802. The other half-shell 802 is placed over the first half-shell, abutting their inner surfaces 803, and aligning the edges, center channels and attachment screw holes 812. The combination of the center channels 804 creates a central bore within which the bearing end of spindle 810 is rotatably retained, without requiring a separate bearing sleeve. In other words, the central bore itself is the bearing surface. The material of which the half-shells 802 are molded is preferably a hard nylon, or similar plastic, containing Teflon™, or like material, which provides a self-lubricated bearing surface for the spindle 610. This provides a simple, inexpensive pedal which incorporates only three basic pieces—the two half-shells 802 and the spindle 810. Although the preferred embodiment describes this pedal as including the above-described fastening mechanism, this pedal construction may be used alone or with any type of fastening means for releasably attaching the pedal to the rider's shoe. Alternatively, the central bore of a pedal constructed of any durable material (plastic or metal) may be lined with Teflon™, or similar material, to reduce friction for rotation of the pedal relative to the spindle.

The above described embodiments of the pedal locking mechanism provide lightweight and readily manufactured means for releasably engaging a rider's foot with a bicycle pedal when compared with the relatively complex mechanisms that are currently available. The simplicity of the locking mechanism greatly decreased susceptibility to failure resulting from dirt build-up within the mechanism. Further, while the above embodiments have been described in their applicability to mountain bike pedals, such mechanisms could easily be incorporated in a clipless pedal system for any other type of bicycle. In the engaged position, a firm lock is maintained to prevent separation while still permitting a limited amount of rotation, if desired. To disengage, one-half of the locking mechanism rotated with respect to the other half to some pre-determined angle until the head can be separated from the rails.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A clipless bicycle pedal system having a pedal and a cleat for attachment to a rider's shoe comprising:

said pedal comprising:

a body comprising an upper half-shell and a lower half-shell, said upper half-shell and said lower half-shell being mirror-images of each other, each of said upper and lower half-shells having a semi-circular channel formed in its inner surface which forms a circular bore when said upper and lower half-shells are joined within which a pedal spindle is rotatably retained;

a neck portion extending from each of a top surface of said upper half-shell and a bottom surface of said lower-half shell, said neck portion having a neck diameter; and a head portion disposed on an end of each said neck portion, said head portion having a head thickness and a pair of head tabs extending diametrically opposite each other on said head portion, said pair of head tabs having a tab width; and said cleat comprising:

a cleat plate having a front, a rear and two sides and having means for attachment to said rider's shoe, said cleat plate having a plurality of bores formed therein, at least one bore of said plurality of bores being disposed in each of said two sides;

a pair of screws screwed into said plurality of bores in said two sides and extending perpendicular from said cleat plate, each said screw having a top portion and a stem portion, said stem portion having a height greater than said head thickness and a first spacing between said stem portions being greater than said tab width, and a second spacing between said top portions being smaller than said tab width and greater than said neck diameter;

a stop disposed at said rear of said cleat plate; and a resilient tab disposed at said front of said cleat plate, said resilient tab having a locking edge at its rearmost extent which becomes substantially level with said cleat plate when pressure is applied to said resilient tab by placing said head portion in contact with said cleat and sliding said cleat forward so that said head tabs are between said stem portions and above said top portions and said resilient tab resiles once said head portion has passed said locking edge in said cleat's forward motion to hold said head portion within a locking area defined by said stop, said screws and said resilient tab, wherein said neck diameter closely fits within a third spacing between said stop and said locking edge;

wherein rotation of said cleat relative to said pedal causes said head tabs to exit from said top portions so that said head portion is released from said locking area.

2. A clipless bicycle pedal system as in claim 1 wherein said neck portion is formed integrally with each of said upper half-shell and said lower half-shell.

3. A clipless bicycle pedal system as in claim 1 wherein said neck portion comprises a continuous barrel extending through a central bore in each of said upper half-shell and said lower half-shell.

4. A clipless bicycle pedal system as in claim 1 wherein said head portion comprises a metal cap attached on top of said neck portion.

5. A clipless bicycle pedal system as in claim 1 wherein each said screw is mushroom-shaped.

6. A clipless bicycle pedal system as in claim 1 wherein said cleat further comprises a pair of guide rails disposed perpendicular to said cleat plate and adjacent each said screw with a guide rail width between said pair of guide rails greater than said tab width.

7. A clipless bicycle pedal system as in claim 1 wherein said stop comprises an eccentric cam and a cam screw for rotatably and releasably affixing said eccentric cam to said cleat plate.

8. A clipless bicycle pedal system as in claim 1 further comprising a cam stop disposed on said top surface of said upper half-shell and said bottom surface of said lower half-shell behind said neck portion to limit rotation of said cleat with respect to said pedal.

9. A clipless bicycle pedal system as in claim 1 wherein said resilient tab comprises a metal layer and resilient polymer laminate.

10. A clipless bicycle pedal system as in claim 1 further comprising a bore running from an edge of said body to said circular bore through which a grease may be injected into said circular bore.

11. A clipless bicycle pedal system as in claim 1 wherein each said screw has an L-shaped profile.

12. A clipless bicycle pedal system as in claim 1 wherein each of said upper half-shell and said lower half-shell is formed from plastic or similar polymer.

13. A clipless bicycle pedal system as in claim 1 further comprising a resistance nub disposed on said top surface of said upper half-shell and said bottom surface of said lower half-shell substantially in front of said neck portion.

14. A clipless bicycle pedal system as in claim 13 wherein said resilient tab includes a metal layer with a curvature at a corner of said locking edge for cooperating with said resistance nub to depress said resilient tab when said cleat is rotated.

15. A locking mechanism for releasably attaching a cleat affixed to the sole of a rider's shoe and a bicycle pedal in a clipless bicycle pedal system, said locking mechanism comprising:

a pedal body with a head portion and neck portion disposed thereon, said head portion having a pair of tabs extending diametrically opposite each other with a tab spacing and tab thickness, said head portion having a head diameter and said neck portion having a neck diameter substantially equal to said head diameter and smaller than said tab spacing, said neck portion having a neck length, said pedal body comprising a pair of half-shells with means for rotatably retaining a pedal spindle therein, each of said half-shells having a contact surface, said head portion and said neck portion being disposed on said contact surface; and at least two engaging means disposed on a cleat plate, each of said engaging means comprising a screw screwed into a side of said cleat plate, each said screw having a top portion and a stem portion, said stem portion of one of said screws being disposed perpendicular to said cleat plate at a first spacing from said stem portion of another of said screws, said first spacing being greater than said head diameter, each said stem portion having a first height below said cleat plate with a second spacing between said top portion of one of said screws and said top portion of another of said screws, said second spacing being smaller than said first spacing and said tab spacing, and larger than said neck diameter, each said top portion having a second thickness smaller than said neck length and said tab thickness being smaller than said first height;

a stop disposed at a rearward end of said cleat plate to prevent forward movement of said cleat plate at a predetermined limit while engaged with said pedal body; and a resilient tab disposed at a forward end of said cleat plate at a distance from said stop slightly larger than said neck diameter, said resilient tab being depressed to permit forward movement of said cleat plate until reaching said predetermined limit and resiling when a rear portion of said head portion strikes said stop, thereby locking said head portion in place;

wherein rotation of said cleat plate relative to said pedal body causes said head portion to be released from said engaging means.

16. A locking mechanism as in claim 15 wherein said neck portion is formed integrally with each of said half-shells.

17. A locking mechanism as in claim 15 wherein said neck portion comprises a continuous barrel extending through a central bore in each said half-shell.

18. A locking mechanism as in claim 15 wherein said head portion comprises a metal cap attached on top of said neck portion.

19. A locking mechanism as in claim 15 wherein each said screw is mushroom-shaped.

20. A locking mechanism as in claim 15 wherein said cleat plate further comprises a pair of guide rails disposed perpendicular to said cleat plate and adjacent each said screw with a guide rail spacing between said pair of guide rails greater than said tab spacing.

21. A locking mechanism as in claim 15 wherein said stop comprises an eccentric cam and a cam screw for rotatably and releasably affixing said eccentric cam to said cleat plate.

22. A locking mechanism as in claim 15 further comprising a cam stop disposed on said contact surface of each said half-shell behind said neck portion to limit rotation of said cleat plate with respect to said pedal body.

23. A locking mechanism as in claim 15 wherein said resilient tab comprises a metal layer and resilient polymer laminate.

24. A locking mechanism as in claim 15 further comprising a bore running from an edge of said pedal body in to a portion of said pedal spindle contained within said pedal body through which a grease may be injected.

25. A locking mechanism as in claim 15 wherein each said screw has an L-shaped profile.

26. A locking mechanism as in claim 15 wherein each said half-shell is formed from plastic or similar polymer.

27. A locking mechanism as in claim 15 further comprising a resistance nub disposed on said contact surface of each said half-shell substantially in front of said neck portion.

28. A locking mechanism as in claim 27 wherein said resilient tab includes a metal layer with a curvature at a corner of said resilient tab for cooperating with said resistance nub to depress said resilient tab when said cleat plate is rotated.

* * * * *